(12) United States Patent
Alsahlawi

(10) Patent No.: US 10,352,288 B1
(45) Date of Patent: Jul. 16, 2019

(54) OCEAN WAVE ENERGY GENERATOR AND PARABOLIC CONCENTRATOR SYSTEM

(71) Applicant: Saad KH. S. M. E. Alsahlawi, Safat (KW)

(72) Inventor: Saad KH. S. M. E. Alsahlawi, Safat (KW)

(*) Notice: Subject to any disclaimer, the term of this patent is extended or adjusted under 35 U.S.C. 154(b) by 0 days.

(21) Appl. No.: 16/255,465

(22) Filed: Jan. 23, 2019

(51) Int. Cl.
*F03B 13/14* (2006.01)

(52) U.S. Cl.
CPC .................... *F03B 13/14* (2013.01)

(58) Field of Classification Search
CPC .................................................. F03B 13/1815
See application file for complete search history.

(56) References Cited

U.S. PATENT DOCUMENTS

| | | | |
|---|---|---|---|
| 4,078,382 A | 3/1978 | Ricafranca et al. | |
| 4,249,084 A * | 2/1981 | Villanueva | F03B 13/187 290/53 |
| 6,360,534 B1 | 3/2002 | Denniss | |
| 6,622,483 B2 | 9/2003 | Denniss | |
| 7,045,912 B2 * | 5/2006 | Leijon | F03B 13/1885 290/42 |
| 7,319,278 B2 * | 1/2008 | Gehring | F03B 13/1885 290/42 |
| 7,339,285 B2 * | 3/2008 | Negron Crespo | F03B 13/1815 290/42 |
| 7,683,500 B2 * | 3/2010 | Greenspan | F03B 13/1865 290/53 |
| 8,102,065 B2 * | 1/2012 | Hobdy | F03B 13/20 290/1 R |
| 8,288,881 B2 * | 10/2012 | Leijon | F03B 13/1865 290/53 |
| 8,581,433 B2 * | 11/2013 | Sidenmark | F03B 13/1815 290/53 |
| 8,593,004 B2 * | 11/2013 | Piccinini | F03B 13/1865 290/42 |
| 8,604,631 B2 | 12/2013 | Rohrer | |

(Continued)

FOREIGN PATENT DOCUMENTS

| | | | |
|---|---|---|---|
| GB | 2559764 A * | 8/2018 | ............... F03B 13/20 |
| JP | 5951817 | 4/1984 | |

OTHER PUBLICATIONS

Wang et al., "The Wave Focusing Effect of a Parabolic Wall," ASME 2004 23rd International Conference on Offshore Mechanics and Arctic Engineering, American Society of Mechanical Engineers, 2004.

*Primary Examiner* — Thomas E Lazo
(74) *Attorney, Agent, or Firm* — Richard C. Litman

(57) ABSTRACT

An ocean wave energy generator and parabolic concentrator system includes a parabolic reflector wall, which may be in the form of a breakwater wall or the like, a generator adapted for mounting beneath a surface of a body of water, and a buoy. The buoy floats on the surface of the water and is coupled to the generator by a chain or the like. Wave-driven vertical oscillation of the buoy drives the generator to generate electrical power. The wall has opposed first and second surfaces, with the first surface thereof facing the buoy and having a parabolic contour. Because of the parabolic contour of the first surface, the first surface can reflect and focus waves to a single focus point or area. The buoy is positioned at the focus point in order to maximize power conversion.

3 Claims, 4 Drawing Sheets

(56) References Cited

U.S. PATENT DOCUMENTS

| | | | |
|---|---|---|---|
| 9,048,725 B2 * | 6/2015 | Leijon | F03B 13/1845 |
| 9,059,605 B2 * | 6/2015 | Murray | H02J 15/003 |
| 9,062,427 B2 | 6/2015 | Kittel | |
| 9,062,649 B2 * | 6/2015 | Greco | F03B 13/1815 |
| 9,847,697 B2 * | 12/2017 | Degrieck | H02K 7/1853 |
| 2014/0077496 A1 | 3/2014 | Gill Londono | |
| 2014/0084727 A1 * | 3/2014 | Martinez | F03B 13/20 |
| | | | 310/154.02 |
| 2014/0117671 A1 * | 5/2014 | Gregory | F03B 13/22 |
| | | | 290/53 |

* cited by examiner

OCEAN WAVE ENERGY GENERATOR AND PARABOLIC CONCENTRATOR SYSTEM

BACKGROUND

1. Field

The disclosure of the present patent application relates to energy generation, and particularly to an ocean wave energy generator for generating usable electrical power from ocean waves, and more particularly to the usage of a parabolic concentrator for focusing the ocean waves.

2. Description of the Related Art

Concerns regarding the limited resources of traditional combustible hydrocarbon fuel sources (and the damaging emissions resulting from their use) has prompted considerable research into sustainable non-polluting energy sources, such as wind, waves, geothermal and solar energies. While significant technological advances have been made in the conversion of energy from some of these alternative areas, such as wind and solar, the majority of wave powered generation systems proposed to date have not been physically practical and/or economically viable.

In this regard, many different types of wave powered generation systems have been proposed, most of which are founded on the basic principle of using the vertical motion inherent in the movement of waves to effect a corresponding displacement of a component of the generating system. However, such conventional power generation systems tend to suffer from numerous disadvantages. For example, one such traditional wave energy conversion system utilizes oscillating floating paddles, the motion of which is converted directly or indirectly to electrical power. However, these floating paddle systems typically have a low energy conversion efficiency and are unable to withstand adverse weather conditions. Thus, such systems are limited to coastal locations having only moderate and predictable wave patterns and, further, the systems must be removed to a suitable shelter when storms are expected.

Other common systems include generators based on the concept of channeling the waves through water displacement pumps or, alternatively, into large accumulators or reservoirs, where the hydrostatic pressure of the stored water is subsequently used to drive a turbine generator or the like. Similar to the previous system, the overall energy conversion efficiency is relatively low, particularly in view of the associated capital costs.

Most conventional ocean wave energy conversion systems have limited usage due to their limitations with regard to maximum achievable wave amplification, particularly for a given level of capital expenditure. Thus, an ocean wave energy generator with a parabolic concentrator solving the aforementioned problems is desired.

SUMMARY

An ocean wave energy generator and parabolic concentrator system includes a parabolic reflector wall, which may be in the form of a breakwater wall or the like, a generator adapted for mounting beneath a surface of a body of water, such as on the seabed of an ocean or sea, and a buoy, such as a bicone buoy or the like. The buoy floats on the surface of the water and is coupled to the generator by a chain or the like. Wave-driven vertical oscillation of the buoy drives the generator to generate electrical power. The wall has opposed first and second surfaces, with the first surface thereof facing the buoy and having a parabolic contour. Because of the parabolic contour of the first surface, the first surface can reflect and focus waves to a single focus point or area. The buoy is positioned at the focus point in order to maximize power conversion.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
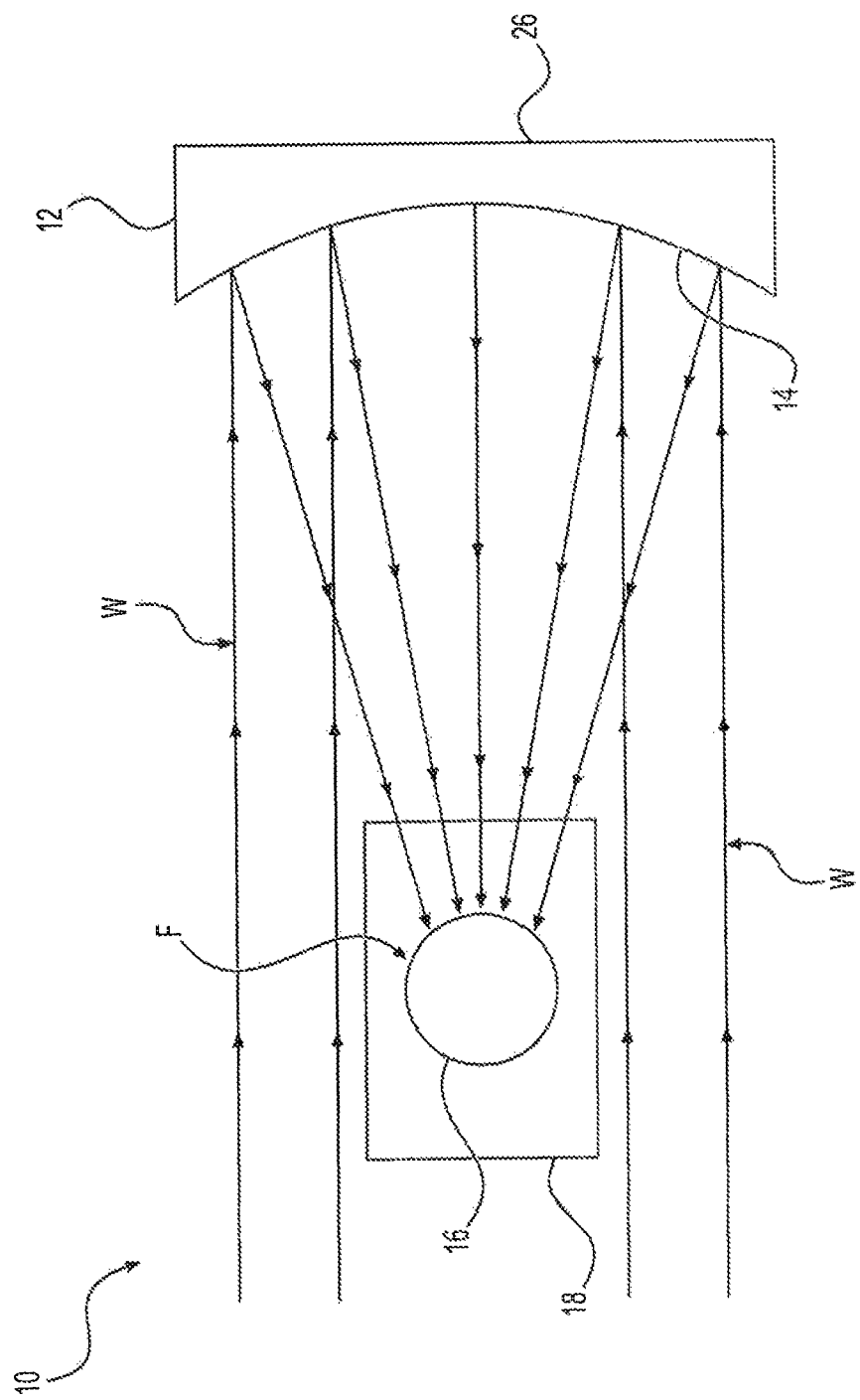
FIG. 1 is a top view of an ocean wave energy generator with a parabolic concentrator.
Figure 2:
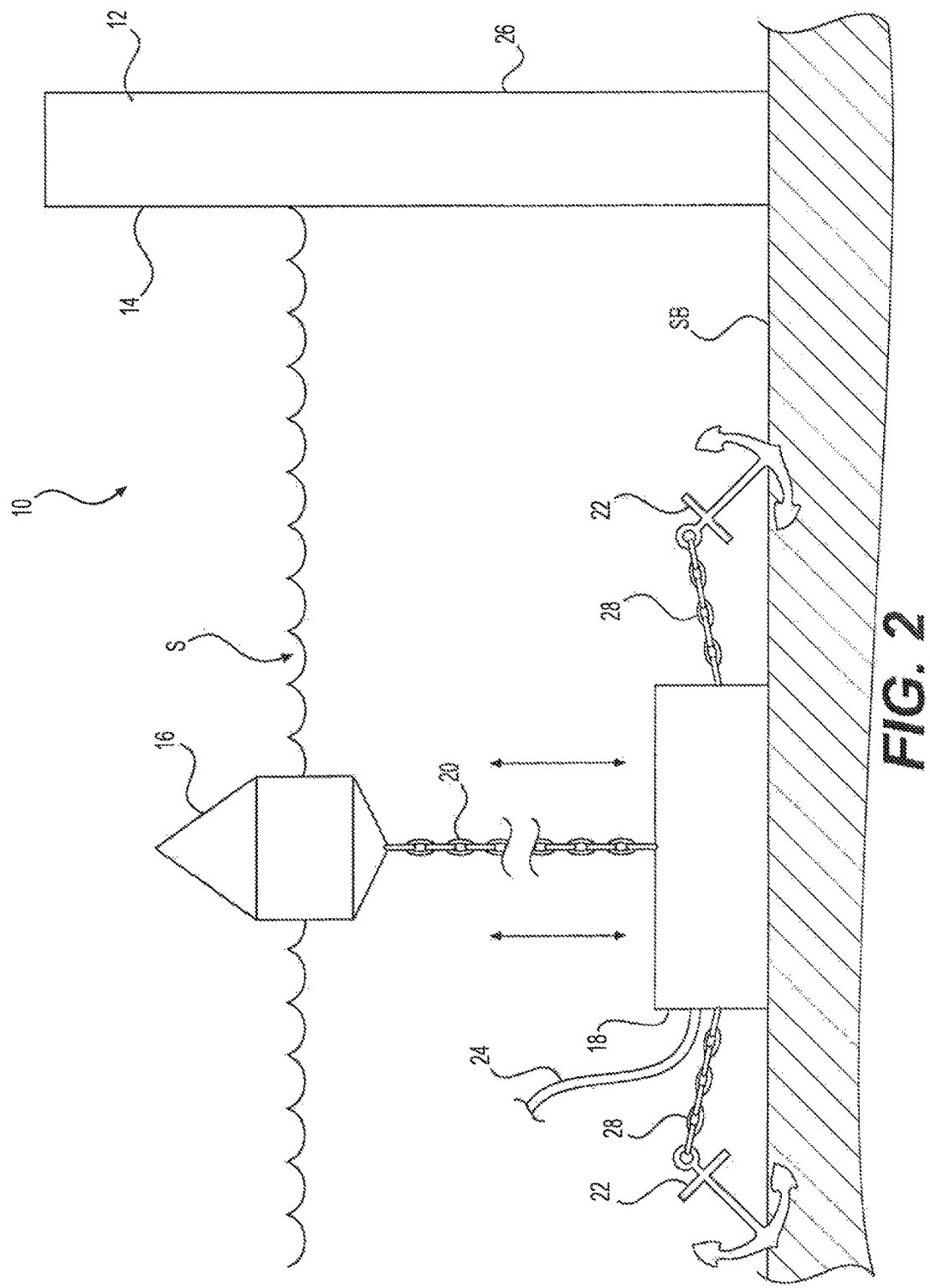
FIG. 2 is a side view of the ocean wave energy generator with a parabolic concentrator.

Referring now to FIGS. 1 and 2, the ocean wave energy generator and parabolic concentrator system 10 includes a parabolic reflector wall 12, a generator 18, and a buoy 16. The generator 18 is adapted for mounting beneath a surface of a body of water, such as on the seabed SB of an ocean or sea. The buoy 16, such as a bicone buoy or the like, floats on the surface S of the water and is coupled to the generator 18 by a chain 20 or the like. The parabolic reflector wall 12 may be in the form of a breakwater wall or the like, and can reflect and focus ocean waves W to a point on the buoy. Wave-driven vertical oscillation of the buoy 16 drives the generator 18 to generate electrical power, which may be received by an external load, storage battery or the like by line 24.

It should be understood that generator 18 may be any suitable type of generator for converting oscillatory motion into electrical energy, such as a conventional pull-chain or pull-cord generator, as is well known in the art. The generator 18 can include a cord wrapped around a spring-loaded spool connected to a ratchet and a rotor of an electric generator. When the cord is pulled, the spool spins the rotor, generating electricity. A spring element returns the spool to its relaxed position after tension in the cord is released. Further, it should be understood that the buoy 16 may be any buoyant body, and that bicone buoy 16 is shown for exemplary purposes only. It should also be understood that chain 20, coupling buoy 16 to generator 18, is shown for exemplary purposes only, and that any suitable type of line may be used. Additionally, in FIG. 2, a pair of anchors 22, connected by chains 28, are shown mooring generator 18 to seabed SB. It should be understood that shackles, swivels, mooring connectors or any suitable type of mooring structure, mount or the like may be utilized, and that anchors 22 and chains 28 are shown for exemplary purposes only.

The wall 12, in the form of a breakwater wall or the like, has opposed first and second surfaces 14, 26, respectively, with the first surface 14 facing the buoy 16 and having a parabolic contour. Because of the parabolic contour of the first surface 14, the first surface 14 can reflect and focus waves to a single focus point or area F. The buoy 16 is positioned at the focus point F opposite the first surface 14 of wall 12, so that the first surface 14 of wall 12 reflects and focuses waves W on the buoy 16. In this manner, the system 10 can amplify the incident waves significantly, e.g., by 3 to 4 times. The increased energy density of the waves can make energy conversion more efficient. In an embodiment, the wall 12 is a floating breakwater.

In experiments described herein, it was found that the ocean wave energy generator and parabolic concentrator system 10 can absorb about 260 kW of power at prototype scale (1:16). For these experiments, a wave flume tank was constructed, having a length of 40 m, a width of 2.5 m and a depth of 2.5 m. An active absorption type wave maker was installed in the wave flume tank, and was capable of generating waves of amplitudes up to 40 cm with wave periods in the range of 1.0 to 5.0 sec. and lower. The water depth near the wave maker was 1.5 m, and a constant water depth of 1.5 m was chosen for all the tests to represent deep water conditions. The wavelength is related to the wave period by:

$$L_0 = \frac{gT^2}{2\pi}, \quad (1)$$

where g is the gravitational acceleration near the surface of the Earth, $L_0$ is the wavelength, and T is the period.

The slope of the simulated beach began at a distance of 30.5 m to 38.8 m from the wave generator. Six conductive type wave probes (WP1-WP6) were calibrated and arranged at two different locations within the flume tank. In order to establish wave reflection within the tank and ensure steady state conditions, the distance between the wave maker and probe WP1 was chosen to be 11 m. To complete the cluster, probes WP2 and WP3 were placed at distances of 11.5 and 11.75 m from the wave maker, respectively. Probes WP1, WP2 and WP3 were used to measure the incident waves. Probes WP4, WP5 and WP6 were used for measuring the wave focusing effects created by each parabola. These were placed within close proximity to the parabola plate so that wave heights in the amplification zone could be monitored closely.

The relative heave motion of the point absorber was registered by a linear potentiometer. In order to ensure the accuracy of the potentiometer measurements, a camera tracking system was also used. Force measurements were needed to evaluate the power generation performance of the buoy and were obtained by using two calibrated load cells. A motor was connected to the buoy to provide damping to represent a power take-off (PTO) mechanism. The motor was connected to an open circuit (i.e., nothing was connected to its terminals) or to one of two short circuits (i.e., one circuit in which all terminals were connected together, and the other circuit with only two terminals connected together). The difference between these tests provided information regarding how much of the total torque resistance was caused by the electric current.

Video image analysis of the water surface was used to visualize the focusing and amplification effects at the maximum amplification zone(s). Water surface movement and wave elevations were detected using orange polystyrene beads scattered around the area of interest and at various locations in the tank. The motion of the beads was tracked with carefully positioned cameras, which allowed the motion of the marked beads to be mapped and translated into x-y-z coordinates for motion analysis. Time and movement histories of waves were recorded and analyzed further.

The flume tank tests were carried out with regular, unidirectional, two-dimensional, long crested waves. A range of very low discrete wave states, representative of typical Kuwaiti sea conditions, were considered. The range of wave states chosen also took into account the minimum operating range of the wave maker. In order to achieve the experimental objectives and investigate the focusing effects at the amplification zone(s), a range of very low discrete regular wave states (wave periods of T=3.2, 3.4, 3.6, 4.0 and 4.8 s, and wave amplitudes of H=0.48, 0.96 and 1.44 m), representing Kuwait sea conditions, were considered. A spectrum of wave components was generated together, so that the testing time could be reduced. A Froude scaling of 1:16 was used to obtain the values of the scale model parameters. The scale factor for the wave height was λ and for the wave period was $\sqrt{\lambda}$.

The mean wave period design condition for the prototype of a parabolic concentrator was chosen to be T=6.5 s with a wavelength of 66 m. The shape of the parabola in the x-y plane was described by $y^2=-2px$, where the focal point is defined by $$x = -\frac{p}{2} \text{ at } y = 0.$$

The focal length of the parabola was chosen to be 5 m, based on 7.5% of the design wavelength. The focal point of the parabola was exactly in line with the edges of the parabolic wall, and the focal length was 0.625 m. The parabola plates were fabricated from stainless steel beams and sheets. In total, six horizontal beams were bent using a wooden design template, and three vertical beams were added for support. Sheets were then placed on the beams facing the incoming wave direction.

A bicone buoy was used with an upper angular span of 60° and a lower angular span of 120°. Corresponding to 1:16 model scale for the tests, the test bicone buoy had a diameter of 0.3215 m, a total cylinder height of 0.26 m, a cylinder wetted height of 0.13 m, and a cone wetted height of 0.0902 m. The mass of the test buoy was 9 kg, and the buoy was fabricated from 1.5 mm stainless steel. Sand was added to the buoy from the top for stabilization and to adjust its draft, giving a final total mass of approximately 11.63 kg.

Waves were generated and data for each regular wave test run was collected for a total duration of 90 sec at a sample frequency of 40 samples per second ($\Delta t=1/40$ sec). Data collection was initiated from zero sec in order to get the full spectrum (progression) of wave buildup at each wave probe towards the end of the test. Wave height at the maximum amplification zone(s), incident wave height, and wave reflection coefficients were measured.

Preliminary numerical assessment of the parabolic concentrator technology potential was performed using a volume of fluid (VOF) method in computational fluid dynamics (CFD) software. For deep water conditions, the total energy stored in waves per unit area of sea surface is simplified as:

$$\overline{E} = \frac{1}{8}\rho g H^2, \qquad (2)$$

where $\rho$ is the fluid density, H is the height of the wave, and $\overline{E}$ is the total energy stored in the waves per unit area. The power per unit length of waves is found by multiplying the energy intensity in the wave with the group velocity of the wave ($v_g$). Therefore, the power in the wave front or average incident wave power per unit crest width (P) is defined as:

$$P = v_g \overline{E}. \qquad (3)$$

The power absorbed by a heaving buoy ($P_a$) with velocity, v, across its damper, subjected to a force $F_i$ is given by:

$$P_a = \frac{1}{N \Delta t} \sum_{i=1}^{N} F_i v_i \Delta t. \qquad (4)$$

The absorption width is defined as the length of the wave front transporting the same amount of power as the device would absorb under the same wave conditions. The absorption width is found by dividing the power absorbed by the heaving buoy ($P_a$) by the power in the wave front (P). Thus, the absorption width is given by:

$$\text{Absorption Width} = \frac{P_a}{P}. \qquad (5)$$

The absorption efficiency, also referred to as the "relative absorption width", is the ratio of the absorbed power to the available power transported by the wave front over the width of either the buoy or the flume tank. Absorption efficiency, $\eta$, is given by:

$$\eta = \frac{P_a}{PL} \times 100. \qquad (6)$$

The continuous periodic force exerted by the wave on the buoy was can be represented by a summation of the first, second, third, fourth and fifth harmonics of a Fourier series, which takes a periodic signal and decomposes it into a sum of a number of sine and cosine expressions with different frequencies.

The test setup consisted of a buoy, a cable/pulley arrangement, and a PTO at a fixed distance from the wave maker and connected to the flume tank by an arrangement of five non-stretchable stainless steel wire cables. The use of wire cables enabled the construction of a system with a high mechanical strength which allowed for a high degree of movement. This resulted in a significant improvement in the survivability of the buoy in larger waves. The performance of the combined parabola-buoy configuration was examined for the following two cases: (i) parabolic concentrator heave only with an undamped point absorber, and (ii) parabolic concentrator heave only with a damped point absorber.

Figure 3A:
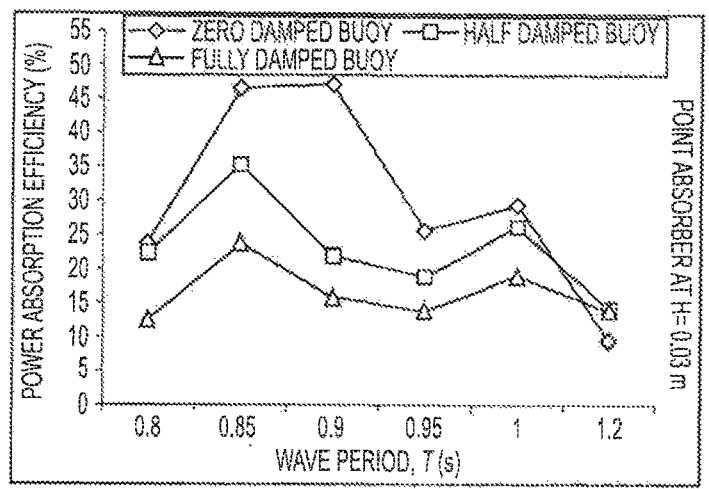
FIG. 3A is a plot showing power absorption efficiency as a functions of wave period for the ocean wave energy generator with a parabolic concentrator for a wave height of 0.03 m, with comparisons of a buoy with zero damping, a buoy with half-damping, and a buoy with full damping.
Figure 3B:
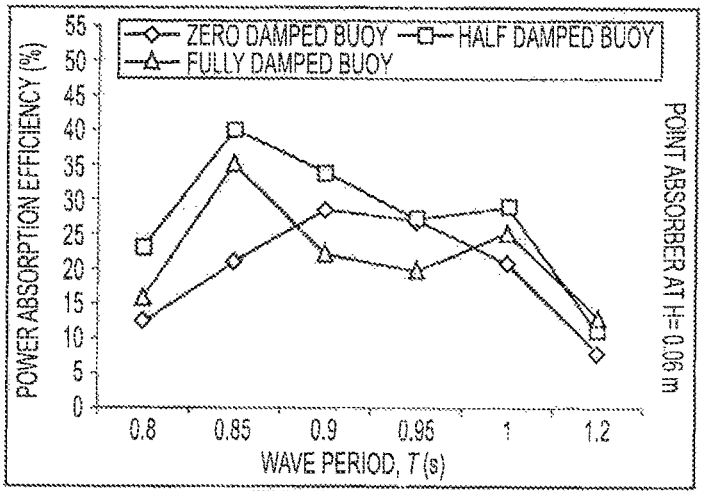
FIG. 3B is a plot showing power absorption efficiency as a functions of wave period for the ocean wave energy generator with a parabolic concentrator for a wave height of 0.06 m, with comparisons of a buoy with zero damping, a buoy with half-damping, and a buoy with full damping.
Figure 3C:
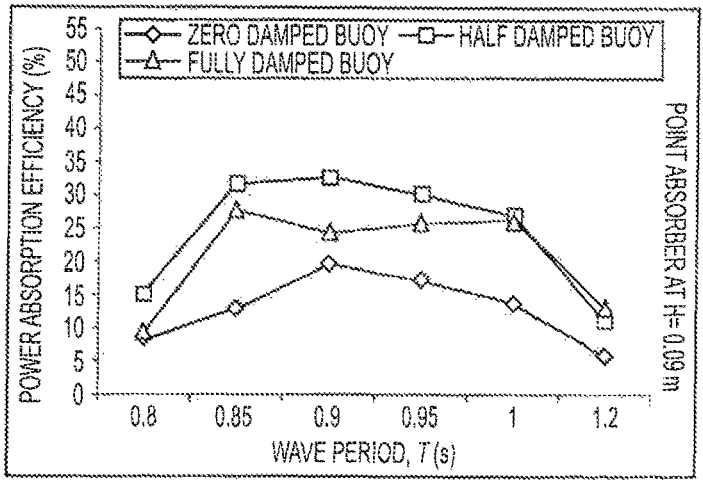
FIG. 3C is a plot showing power absorption efficiency as a functions of wave period for the ocean wave energy generator with a parabolic concentrator for a wave height of 0.09 m, with comparisons of a buoy with zero damping, a buoy with half-damping, and a buoy with full damping.
Figure 4A:
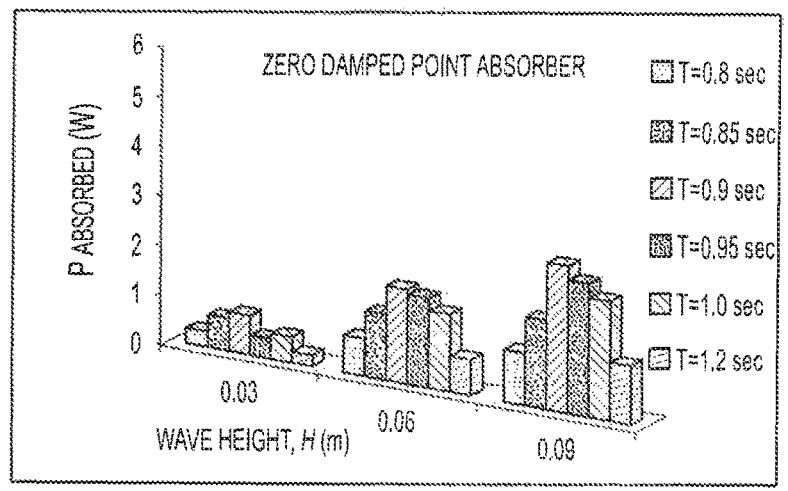
FIG. 4A is a graph comparing power absorption for the ocean wave energy generator with a parabolic concentrator for wave heights of 0.03 m, 0.06 m and 0.09 m, using a buoy with zero damping.
Figure 4B:
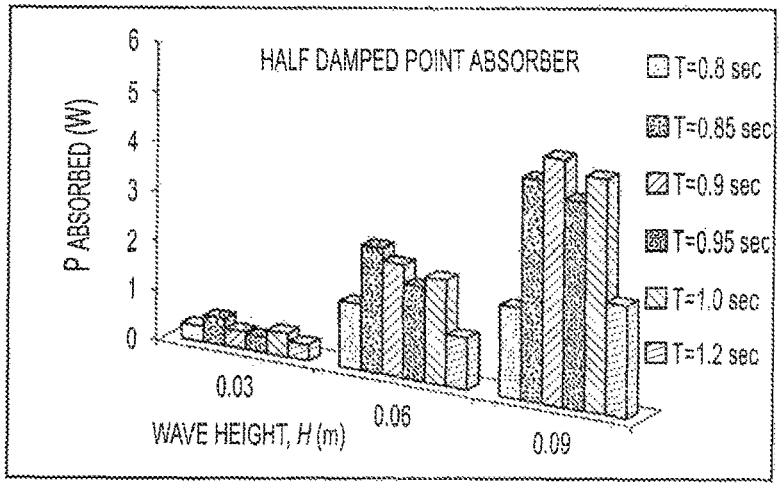
FIG. 4B is a graph comparing power absorption for the ocean wave energy generator with a parabolic concentrator for wave heights of 0.03 m, 0.06 m and 0.09 m, using a buoy with half damping.
Figure 4C:
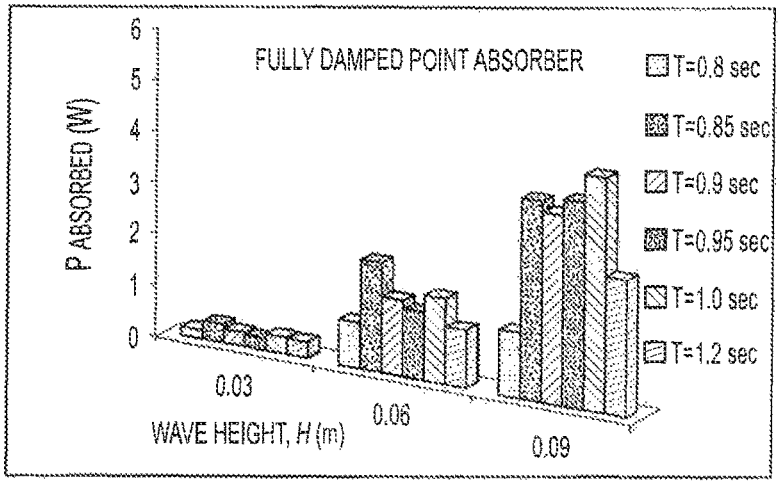
FIG. 4C is a graph comparing power absorption for the ocean wave energy generator with a parabolic concentrator for a wave heights of 0.03 m, 0.06 m and 0.09 m, using a buoy with full damping.

The behaviors of the zero damped buoy (very low damping for practical purposes), half-damped buoy and fully damped buoy were tested in regular waves of different heights and periods. More specifically, wave periods of 0.8, 0.85, 0.9, 0.95, 1.0 and 1.2 s, and wave heights of 0.03 m, 0.06 m and 0.09 m were used. The overall power absorption efficiency $\eta$ was calculated using equation (6), with L taken as the flume tank width. The efficiency values were calculated using the average incident wave power per unit flume tank width instead of unit buoy width in order to account for the presence of the parabola. This is because the buoy is permitted to absorb power from the total wave front focused by the parabola, and not just the wave front with the same width as the buoy. FIGS. 3A, 3B and 3C show the resultant power absorption efficiencies, as functions of wave period, for wave heights of 0.03 m, 0.06 m, and 0.09 m, respectively. FIGS. 4A, 4B and 4C compare power absorption for the ocean wave energy generator with a parabolic concentrator for wave heights of 0.03 m, 0.06 m and 0.09 m, using buoys with zero damping, half damping and full damping, respectively.

The results showed a maximum efficiency of 47%, which was achieved for the zero-damped buoy with H=0.03 m and T=0.9 s. The presence of the parabolic reflector affected the buoys' power absorption in a significant way. The lowest absorbed powers were recorded at the two extremes of the wave period range. The highest wave absorption occurred at wave periods ranging between 0.85 s and 1.0 s for all wave heights, thus providing a desirable wave spectrum operation range. The absorbed power was found to be dependent on the wave period and wave height.

External damping was clearly found to affect the power absorbed by the parabola-buoy structure. Applying a small amount of damping to the buoy (i.e., half damped) was seen to be better than applying full damping (as seen in FIG. 3C). When the buoy was subjected to low damping, a maximum power absorption of 5 W was recorded, thus this buoy would be capable of absorbing almost 82 kW at prototype scale. The results showed the design's suitability for conditions in which regular narrow banded waves are dominant in mild wave climates, similar to that found in Kuwait. The desired wave spectrum operational range in Kuwaiti sea conditions was found to be T=3.4-4.0 s (prototype scale) for all tested wave heights.

The above describes the results of the test using a 1:16 model scale ratio. In an embodiment, a full size system 10 may include wall 12 having a length of approximately 40 m, a height of approximately 8 m, and a width of approximately 3 m. Buoy 16 may have a diameter of approximately 5 m, a draft of approximately 2.4 m, and a total height of 9.4 m. The buoy 16 may be formed from epoxy painted steel, for example, and, as is conventionally known, may include a manhole, a bulkhead, an internal ladder, a mooring and/or lifting eyebolts. Any suitable type of anchors 22 may be used, such as conventional 9.5 ton steel anchors or the like.

It is to be understood that the ocean wave energy generator with a parabolic concentrator is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. An ocean wave energy generator and parabolic concentrator system, comprising:
    a generator adapted for mounting beneath a surface of a body of water;
    a buoy adapted for floating on the surface of the body of water, the buoy being coupled to the generator such that wave-driven vertical oscillation of the buoy drives the generator to generate electrical power, wherein the buoy is a bicone buoy having a cylindrical central portion and opposed conical top and bottom surfaces, the top surface being at a 60° angle and the bottom surface being at a 120° angle; and
    a wall having opposed first and second surfaces, the first surface thereof facing the buoy and having a parabolic contour, wherein the buoy is positioned at a focal point of the first surface of the wall such that the first surface of the wall reflects and focuses waves on the buoy.

2. The ocean wave energy generator and parabolic concentrator system as recited in claim 1, further comprising at least one anchor coupled to the generator.

3. The ocean wave energy generator and parabolic concentrator system as recited in claim 1, wherein the generator is a pull-cord generator.

* * * * *